United States Patent
Abel et al.

(10) Patent No.: US 7,658,349 B2
(45) Date of Patent: Feb. 9, 2010

(54) PILOT FLIGHT CONTROL STICK HAPTIC FEEDBACK SYSTEM AND METHOD

(75) Inventors: Stephen G. Abel, Chandler, AZ (US); Casey Hanlon, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 269 days.

(21) Appl. No.: 11/739,479

(22) Filed: Apr. 24, 2007

(65) Prior Publication Data
US 2008/0099629 A1 May 1, 2008

Related U.S. Application Data

(60) Provisional application No. 60/854,764, filed on Oct. 26, 2006.

(51) Int. Cl.
*B64C 13/46* (2006.01)
(52) U.S. Cl. .................................................... 244/223
(58) Field of Classification Search ............... 244/223, 244/75.1, 229, 228, 234, 236
See application file for complete search history.

(56) References Cited

U.S. PATENT DOCUMENTS

| | | | | |
|---|---|---|---|---|
| 2,983,469 | A | * | 5/1961 | Marx .......................... 244/191 |
| 3,015,458 | A | * | 1/1962 | Marx .......................... 244/182 |
| 3,094,300 | A | * | 6/1963 | Osder .......................... 244/181 |
| 3,578,267 | A |   | 5/1971 | Kazmarek |
| 3,960,348 | A |   | 6/1976 | Fowler et al. |
| 4,150,803 | A |   | 4/1979 | Fernandez |
| 4,477,043 | A |   | 10/1984 | Repperger |
| 4,659,313 | A |   | 4/1987 | Kuster et al. |
| 4,664,346 | A | * | 5/1987 | Koenig .......................... 244/223 |
| 4,795,296 | A |   | 1/1989 | Jau |
| 5,125,602 | A | * | 6/1992 | Vauvelle ....................... 244/223 |
| 5,213,282 | A |   | 5/1993 | Gold et al. |
| 5,291,113 | A |   | 3/1994 | Hegg et al. |

(Continued)

FOREIGN PATENT DOCUMENTS

EP 0384806 A1 8/1990

(Continued)

OTHER PUBLICATIONS

EP Search Report, 07119237.1 dated Feb. 19, 2008.

*Primary Examiner*—Tien Dinh
(74) *Attorney, Agent, or Firm*—Ingrassia Fisher & Lorenz, P.C.

(57) ABSTRACT

A pilot flight control stick haptic feedback system includes a pilot user interface, a position sensor, a pilot motor, and a control circuit. The pilot user interface is movable to a position at a movement rate. The position sensor senses the position of the pilot user interface and supplies a pilot user interface position signal. The pilot motor is coupled to the pilot user interface, and receives pilot motor feedback signals. The pilot motor, in response to the pilot motor feedback signals, supplies feedback force to the pilot user interface. The control circuit determines one or more of the pilot user interface position, movement rate, aircraft control surface slew rate capacity, aircraft control surface load rate capacity, and aerodynamic stall risk and, based on at least a subset of these determinations, supplies pilot motor feedback signals to the pilot motor.

14 Claims, 5 Drawing Sheets

U.S. PATENT DOCUMENTS

| | | | |
|---|---|---|---|
| 5,489,830 A * | 2/1996 | Fernandez | 318/628 |
| 5,735,490 A | 4/1998 | Berthet et al. | |
| 5,908,177 A | 6/1999 | Tanaka | |
| 6,128,554 A | 10/2000 | Damotte | |
| 6,459,228 B1 | 10/2002 | Szulyk et al. | |
| 6,644,600 B1 | 11/2003 | Olson et al. | |
| 6,648,269 B2 | 11/2003 | Gold et al. | |
| 2003/0094539 A1 | 5/2003 | Schaeffer et al. | |
| 2003/0183728 A1 * | 10/2003 | Huynh | 244/224 |

FOREIGN PATENT DOCUMENTS

| WO | 03081554 A1 | 10/2003 |
|---|---|---|
| WO | 2005044622 A2 | 5/2005 |

* cited by examiner

PILOT FLIGHT CONTROL STICK HAPTIC FEEDBACK SYSTEM AND METHOD

CROSS-REFERENCES TO RELATED APPLICATIONS

This application claims the benefit of U.S. Provisional Application No. 60/854,764 filed Oct. 26, 2006.

TECHNICAL FIELD

The present invention relates to aircraft flight control systems and, more particularly, to a pilot flight control stick haptic feedback system and method for an aircraft flight control system.

BACKGROUND

Aircraft typically include a plurality of flight control surfaces that, when controllably positioned, guide the movement of the aircraft from one destination to another. The number and type of flight control surfaces included in an aircraft may vary, but typically include both primary flight control surfaces and secondary flight control surfaces. The primary flight control surfaces are those that are used to control aircraft movement in the pitch, yaw, and roll axes, and the secondary flight control surfaces are those that are used to influence the lift or drag (or both) of the aircraft. Although some aircraft may include additional control surfaces, the primary flight control surfaces typically include a pair of elevators, a rudder, and a pair of ailerons, and the secondary flight control surfaces typically include a plurality of flaps, slats, and spoilers.

The positions of the aircraft flight control surfaces are typically controlled using a flight control surface actuation system. The flight control surface actuation system, in response to position commands that originate from either the flight crew or an aircraft autopilot, moves the aircraft flight control surfaces to the commanded positions. In most instances, this movement is effected via actuators that are coupled to the flight control surfaces.

Typically, the position commands that originate from the flight crew are supplied via some type of input control mechanism. For example, many aircraft include two yoke and wheel type of mechanisms, one for the pilot and one for the co-pilot. Either mechanism can be used to generate desired flight control surface position commands. More recently, however, aircraft are being implemented with side stick type mechanisms. Most notably in aircraft that employ a fly-by-wire system. Similar to the traditional yoke and wheel mechanisms, it is common to include multiple side sticks in the cockpit, one for the pilot and one for the co-pilot. Most side sticks are implemented with some type of mechanism for providing force feedback (or "haptic feedback") to the user, be it the pilot or the co-pilot. In some implementations, one or more orthogonally arranged springs are used to provide force feedback. In other implementations, one or more electric motors are used to supply the force feedback.

Although the above-described force feedback mechanisms are generally safe and reliable, each does suffer certain drawbacks. For example, the feedback mechanisms may not provide variable force feedback based on actual aircraft conditions. Moreover, the electric motor implementations are usually provided in double or triple redundant arrangements, which can increase overall system size, weight, and costs, and are usually implemented with force sensors, which also adds to system cost and complexity. Moreover, the feedback loop with force sensors and electric motors can be difficult to tune for acceptable haptic feedback because the motor is typically separated from the force sensor. This can lead to the addition of various other components and complexities.

Hence, there is a need for a pilot side stick feedback mechanism that provides variable force feedback based on actual aircraft conditions and/or that can be implemented with relatively lightweight and/or relatively inexpensive components. The present invention addresses one or more of these needs.

BRIEF SUMMARY

In one embodiment, and by way of example only, a pilot flight control stick haptic feedback system includes a pilot user interface, a position sensor, a pilot motor, and a control circuit. The pilot user interface is configured to receive user input and, upon receipt thereof, to move to a position at a movement rate. The position sensor is coupled to, and is configured to sense the position of, the pilot user interface. The position sensor is further configured to supply a pilot user interface position signal representative of the pilot user interface position. The pilot motor is coupled to the pilot user interface, and is further coupled to receive pilot motor feedback signals. The pilot motor is operable, upon receipt of the pilot motor feedback signals, to supply a feedback force to the pilot user interface at a magnitude based on the pilot motor feedback signals. The control circuit is coupled to receive at least the pilot user interface position signal and configured to determine the pilot user interface movement rate, aircraft control surface slew rate capacity, and aircraft control surface load rate capacity, and to supply the pilot motor feedback signals to the pilot motor based at least in part on the determined pilot user interface movement rate, the determined aircraft control surface slew rate capacity, and the determined aircraft control surface load rate capacity.

In another exemplary embodiment, a pilot flight control stick haptic feedback system for an aircraft includes a pilot user interface, a position sensor, a pilot motor, and a control circuit. The pilot user interface is configured to receive user input and, upon receipt thereof, to move to a position. The position sensor is coupled to, and is configured to sense the position of, the pilot user interface, the position sensor is further configured to supply a pilot user interface position signal representative of the pilot user interface position. The pilot motor is coupled to the pilot user interface and to receive pilot motor feedback signals and is operable to supply a feedback force to the pilot user interface at a magnitude based on the pilot motor feedback signals. The control circuit is coupled to receive at least the pilot user interface position signal and is configured to determine an aerodynamic stall risk of the aircraft based on the pilot user interface position, and to supply the pilot motor feedback signals to the pilot motor based at least in part on the determined aerodynamic stall risk of the aircraft.

In still another exemplary embodiment, a method of controlling haptic feedback to one or more aircraft flight control system user interfaces includes determining the movement rate of a pilot user interface, determining aircraft control surface slew rate capacity, and determining aircraft control surface load rate capacity. The haptic feedback is supplied to the pilot user interface at a magnitude that is based at least in part on the determined pilot user interface movement rate, the determined aircraft control surface slew rate capacity, and the determined aircraft control surface load rate capacity.

In yet another exemplary embodiment, a method of controlling haptic feedback to one or more aircraft flight control system user interfaces includes determining pilot user interface position and an aerodynamic stall risk based on the determined pilot user interface position. The haptic feedback is supplied to the pilot user interface at a magnitude that is based at least in part on the determined aerodynamic stall risk.

Other independent features and advantages of the preferred flight control stick haptic feedback system and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature and is not intended to limit the invention or the application and uses of the invention. Furthermore, there is no intention to be bound by any theory presented in the preceding background or the following detailed description.

Figure 1:
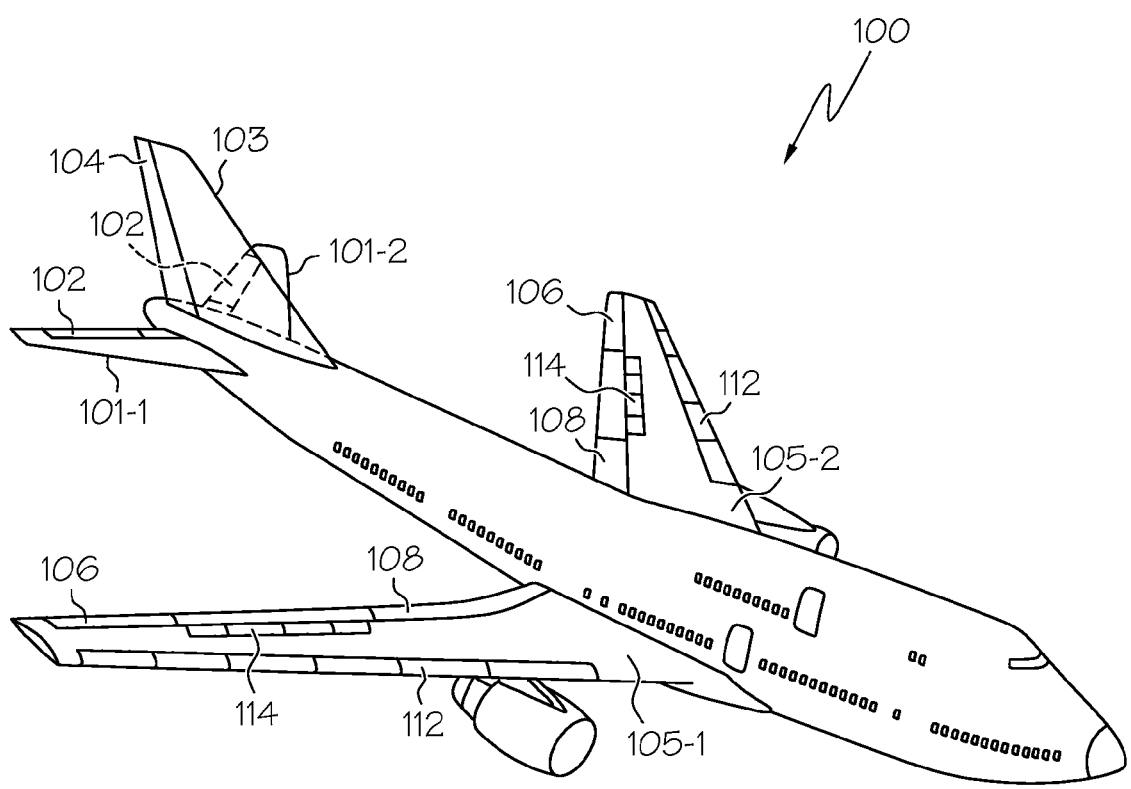
FIG. 1 is a perspective view of an exemplary aircraft depicting primary and secondary flight control surfaces.

Turning first to FIG. 1, a perspective view of an exemplary aircraft is shown. In the illustrated embodiment, the aircraft 100 includes first and second horizontal stabilizers 101-1 and 101-2, respectively, a vertical stabilizer 103, and first and second wings 105-1 and 105-2, respectively. An elevator 102 is disposed on each horizontal stabilizer 101-1, 101-2, a rudder 104 is disposed on the vertical stabilizer 103, and an aileron 106 is disposed on each wing 105-1, 105-2. In addition, a plurality of flaps 108, slats 112, and spoilers 114 are disposed on each wing 105-1, 105-2. The elevators 102, the rudder 104, and the ailerons 106 are typically referred to as the primary flight control surfaces, and the flaps 108, the slats 112, and the spoilers 114 are typically referred to as the secondary flight control surfaces.

The primary flight control surfaces 102-106 control aircraft movements about the aircraft pitch, yaw, and roll axes. Specifically, the elevators 102 are used to control aircraft movement about the pitch axis, the rudder 104 is used to control aircraft movement about the yaw axis, and the ailerons 106 control aircraft movement about the roll axis. It is noted, however, that aircraft movement about the yaw axis can also be achieved by varying the thrust levels from the engines on opposing sides of the aircraft 100. It will additionally be appreciated that the aircraft 100 could include horizontal stabilizers (not shown).

The secondary control surfaces 108-114 influence the lift and drag of the aircraft 100. For example, during aircraft take-off and landing operations, when increased lift is desirable, the flaps 108 and slats 112 may be moved from retracted positions to extended positions. In the extended position, the flaps 108 increase both lift and drag, and enable the aircraft 100 to descend more steeply for a given airspeed, and also enable the aircraft 100 get airborne over a shorter distance. The slats 112, in the extended position, increase lift, and are typically used in conjunction with the flaps 108. The spoilers 114, on the other hand, reduce lift and when moved from retracted positions to extended positions, which is typically done during aircraft landing operations, may be used as air brakes to assist in slowing the aircraft 100.

Figure 2:
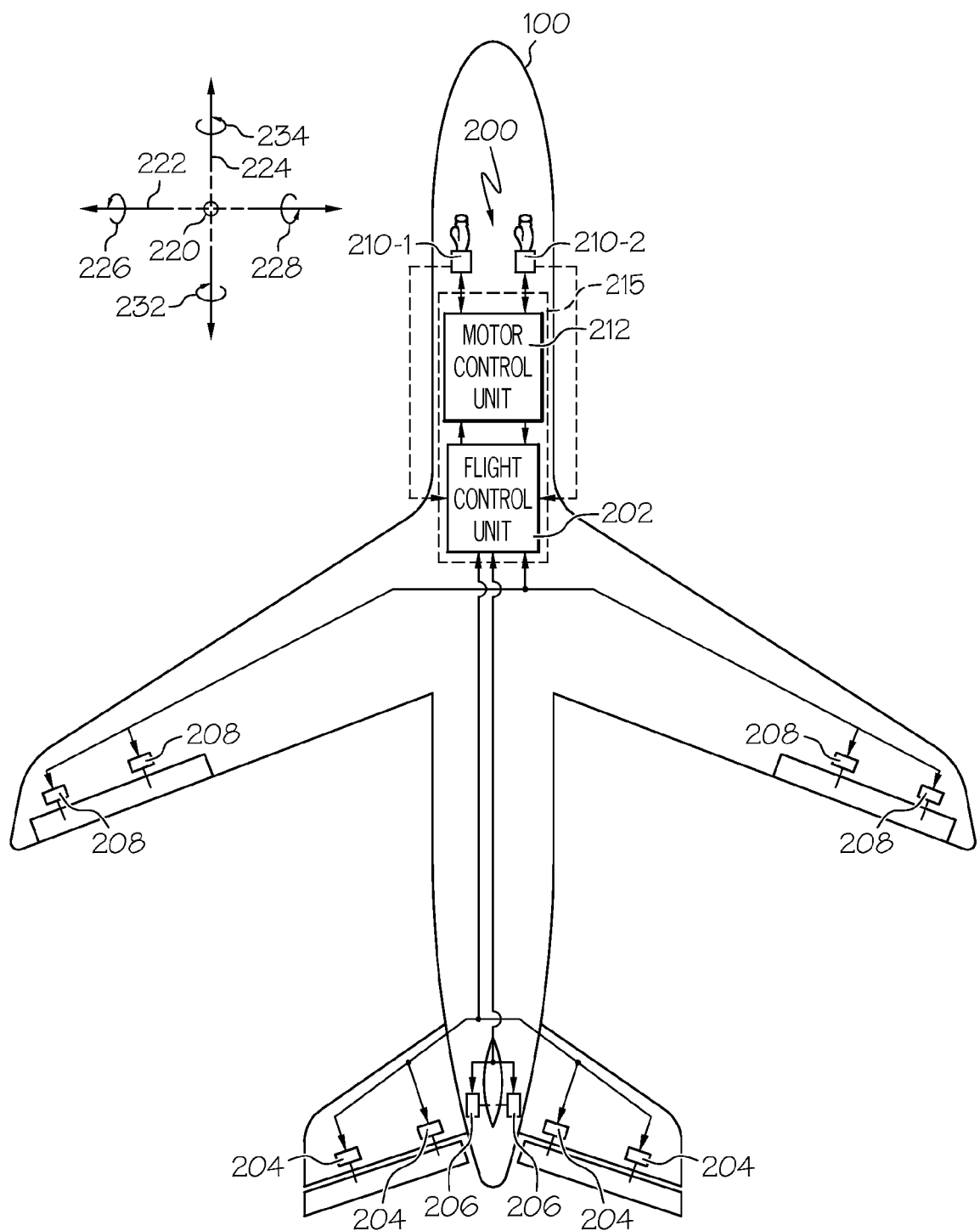
FIG. 2 is a schematic depicting portions of an exemplary flight control surface actuation system according one embodiment of the present invention.

The flight control surfaces 102-114 are moved to commanded positions via a flight control surface actuation system 200, an exemplary embodiment of which is shown in FIG. 2. In the depicted embodiment, the flight control surface actuation system 200 includes one or more flight control units 202, a plurality of primary flight control surface actuators, which include elevator actuators 204, rudder actuators 206, and aileron actuators 208. It will be appreciated that the system 200 may be implemented with more than one flight control unit 202. However, for ease of description and illustration, only a single, multi-channel control unit 202 is depicted. It will additionally be appreciated that one or more functions of the control unit 202 could be implemented using a plurality of devices.

Before proceeding further, it is noted that the flight control surface actuation system 200 additionally includes a plurality of secondary control surface actuators, such as flap actuators, slat actuators, and spoiler actuators. However, the operation of the secondary flight control surfaces 108-114 and the associated actuators is not needed to fully describe and enable the present invention. Thus, for added clarity, ease of description, and ease of illustration, the secondary flight control surfaces and actuators are not depicted in FIG. 2, nor are these devices further described.

Returning now to the description, the flight control surface actuation system 200 may additionally be implemented using various numbers and types of primary flight control surface actuators 204-208. In addition, the number and type of primary flight control surface actuators 204-208 per primary flight control surface 102-106 may be varied. In the depicted embodiment, however, the system 200 is implemented such that two primary flight control surface actuators 204-208 are coupled to each primary flight control surface 102-106. Moreover, each of the primary flight control surface actuators 204-208 are preferably a linear-type actuator, such as, for example, a ballscrew actuator. It will be appreciated that this number and type of primary flight control surface actuators 204-208 are merely exemplary of a particular embodiment, and that other numbers and types of actuators 204-208 could also be used.

No matter the specific number, configuration, and implementation of the flight control units 202 and the primary flight control surface actuators 204-208, the flight control unit 202 is configured to receive aircraft flight control surface position commands from one or more input control mechanisms. In the depicted embodiment, the system 200 includes two user interfaces, a pilot user interface 210-1 and a co-pilot user interface 210-2, and one or more motor control circuits 212. As will be described in more detail below, the pilot 210-1 and co-pilot 210-2 user interfaces are both implemented as flight control sticks. It will be appreciated that in some embodiments, the system 200 could be implemented with more or less than this number of flight control sticks 210. It will additionally be appreciated that the system could be implemented with more than one motor control circuit 212, and that each flight control unit 202 and each motor control circuit 212 could be integrated into a control circuit 215, as depicted in phantom in FIG. 2. Nonetheless, the motor control circuit 212, in response to position signals supplied from one or both flight control sticks 210, supplies flight control surface position signals to the flight control unit 202. The flight control unit 202, in response to the flight control surface position signals, supplies power to the appropriate primary flight control surface actuators 204-208, to move the appropriate primary flight control surfaces 102-106 to positions that will cause the aircraft 100 to implement the commanded maneuver. As depicted in phantom in FIG. 2, in other embodiments the system 200 can be configured such that one or more signals from the user interfaces 210, such as the just-mentioned position signals, are supplied directly to the flight control unit 202, or are supplied to one or more aircraft data buses for communication to the flight control unit 202.

Figure 3:
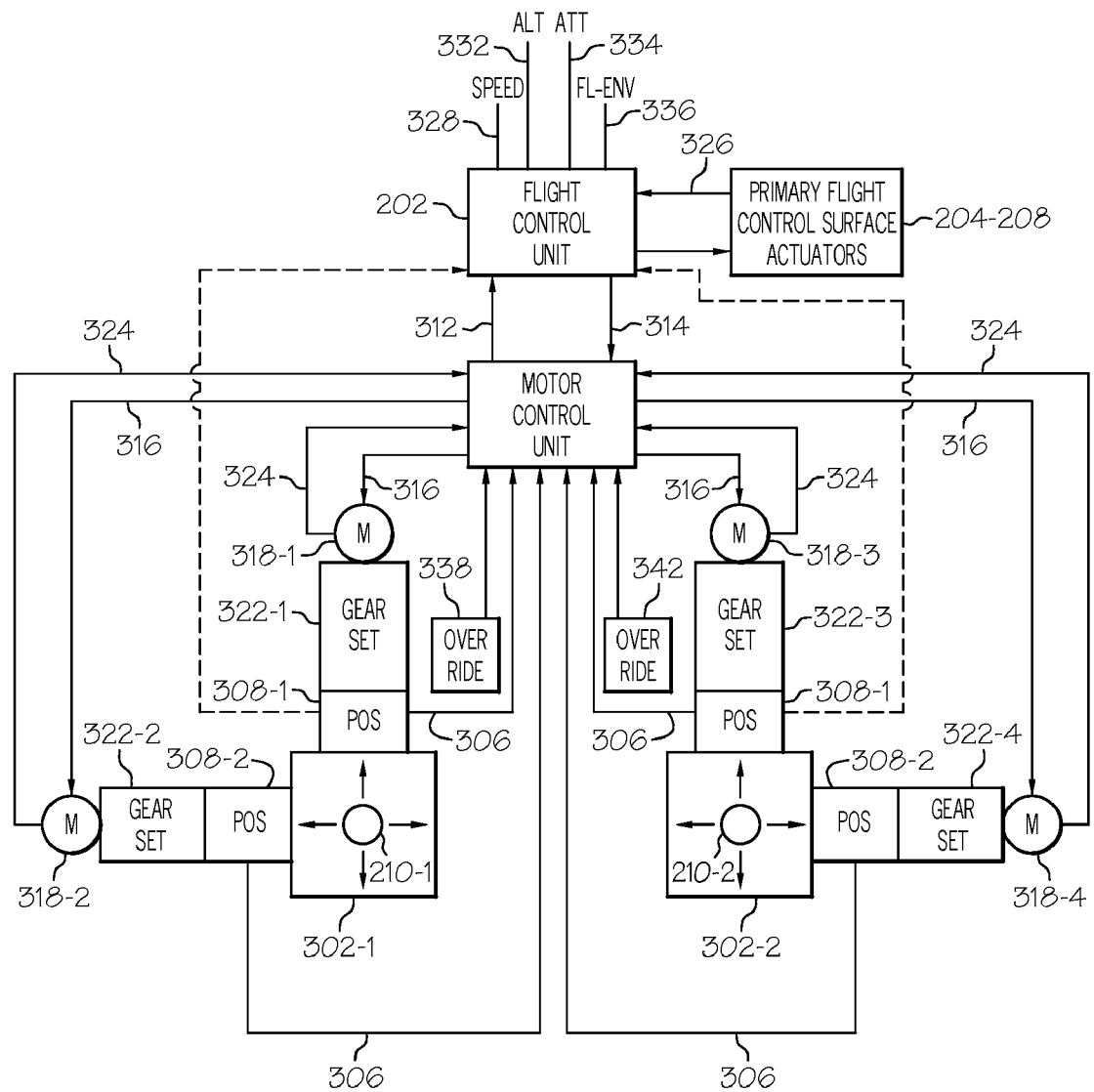
FIG. 3 is a functional block diagram of the flight control surface actuation system of FIG. 2, depicting certain portions thereof in slightly more detail.

Turning now to FIG. 3, which is also a functional block diagram of the flight control surface actuation system 200 depicting portions thereof in slightly more detail, the flight control sticks 210 are each coupled to a gimbal assembly 302 (e.g., 302-1, 302-2), and are each configured to move, in response to input from either a pilot or a co-pilot, to a control position in a rotational direction. Although the configuration of the flight control sticks 210 may vary, in the depicted embodiment, and with quick reference to FIG. 2, each flight control stick 210 is configured to rotate, from a null position 220 to a control position, about two perpendicular rotational axes, which in the depicted embodiment are a pitch axis 222 and a roll axis 224. More specifically, if the pilot or co-pilot moves the flight control stick 210 in a forward direction 226 or an aft direction 228, to thereby control aircraft pitch, the flight control stick 210 rotates about the pitch axis 222. Similarly, if the pilot or co-pilot moves the flight control stick 210 in a port direction 232 or a starboard direction 234, to thereby control aircraft roll, the flight control stick 210 rotates about the roll axis 224. It will additionally be appreciated that the flight control stick 210 may be moved in a combined forward-port direction, a combined forward-starboard direction, a combined aft-port direction, or a combined aft-starboard direction, and back to or through the null position 220, to thereby implement a combined aircraft pitch and roll maneuver.

Returning once again to FIG. 3, the flight control sticks 210, as noted above, are each configured to supply position signals 306 to either the motor control circuit 212, the flight control unit 202, or both, that are representative of its position. To do so, at least two position sensors 308 (e.g., 308-1, 308-2) are coupled to each flight control stick 210, though it will be appreciated that more or less than this number of position sensors could be used. No matter the specific number, it will be appreciated that the position sensors 308 may be implemented using any one of numerous types of position sensors including, but not limited to, RVDTs and LVDTs. The motor control circuit 212, at least in some embodiments, upon receipt of the position signals 306, supplies flight control surface position signals 312 to the flight control unit 202, which in turn supplies power to the appropriate primary flight control surface actuators 204-208, to move the appropriate primary flight control surfaces 102-106 to the appropriate positions, to thereby implement a desired maneuver. Alternatively, and as mentioned above and as depicted in phantom in FIG. 3, the flight control unit 202 may receive the position signals 306 directly from the positions sensors 308 and, in response, supply power to the appropriate primary flight control surface actuators 204-208, to move the appropriate primary flight control surfaces 102-106 to the appropriate positions. The flight control unit 202 may additionally include an auto-pilot, which may process the control surface commands before the commands are supplied to the primary flight control surface actuators 204-208. Also, the flight control surface position signals 312 supplied from the motor control circuit 212 to the flight control unit 202 may be based on an average of pilot and co-pilot stick positions 210.

As FIG. 3 additionally depicts, the motor control circuit 212 also receives one or more force feedback influence signals 314 from the flight control unit 202, and supplies motor drive signals 316 to one or two pilot motors 318-1, 318-2, or one or two co-pilot motor 318-3, 318-4, or various combinations thereof. The motors 318, which are each coupled to one of the flight control sticks 210 via associated gear sets 322 (e.g., 322-1, 322-2, 322-3, 322-4), are each operable, upon receipt of the motor drive signals 316, to supply a feedback force to the associated flight control stick 210. As will be described in more detail further below, the motor drive signals 316 are variable in magnitude, based on the position of the flight control sticks 210, the slew rate of the flight control sticks 210, and various aircraft and control surface conditions, as represented by the one or more feedback influence signals 314. The motor drive signals 316 supplied to the pilot flight control stick 210-1 is also preferably variable in magnitude based on the position of the co-pilot flight control stick 210-2, and vice-versa. The flight control sticks 210, in response to the feedback force supplied from the associated motors 318, supplies haptic feedback to the pilot or co-pilot, as the case may be. Preferably, current feedback signals 324 are supplied to the motor control circuit 212. Moreover, in a particular preferred embodiment, in which the motors 318 are implemented as permanent magnet brushless machine, current feedback and commutation signals 318 are supplied to the motor control circuit 212.

The flight control unit 202, as noted above, supplies one or more force feedback influence signals 314 to the motor control circuit 212. The feedback influence signals 314, as was also noted above, vary in dependence upon various aircraft and control surface conditions. Although the number and types of force feedback influence signals 314 may vary, in the depicted embodiment these signals include signals representative of control surface load rate limits, control surface slew rate limits, control surface no-load positions, and control surface stop positions. It will be appreciated that one or more of these parameters may vary with aircraft conditions. For example, control surface load rate limits and control surface slew rate limits may vary with aircraft speed, angle-of-attack, etc. As such, and as FIG. 3 additionally depicts, the flight control unit 202 receives a plurality of signals representative of aircraft conditions. Although the specific number of signals, and the conditions of which each signal is representative of, may vary, in the depicted embodiment, these signals include primary flight control surface position signals 326, aircraft speed 328, aircraft altitude 332, and aircraft attitude 334. In addition, the flight control unit 202 may also receive a signal representative of aircraft operating envelope 336. It will be appreciated that one or more of these signals may be supplied from individual sensors that are dedicated to the system 200 or shared with other systems in the aircraft, or supplied via one or more data buses within the aircraft. No matter the specific source of each signal that is supplied to the flight control unit 202, the control unit 202 is further operable, in response to one or more of these signals 326-336, to supply the force feedback influence signals 314 to the motor control circuit 212. The force feedback influence signals 314, like the motor drive signals 316, are preferably variable in magnitude, based on the aircraft and control surface conditions, as represented by each of the aircraft condition signals 328-336, and the control surface position signals 326.

As was noted above, the motor drive signals 316 supplied by the motor control circuit 212 vary in magnitude based, at least in part, on the position of the flight control sticks 210, the movement rate of the flight control sticks 210, and various aircraft and control surface conditions, as represented by the one or more feedback influence signals 314. In particular, it is noted that the motor control circuit 212 is configured, upon receipt of the position signals 306, to determine the movement rate of the flight control sticks 210. The motor control circuit 212 is also configured, based on the force feedback influence signals 314, to determine aircraft control surface slew rate capacity, and aircraft control surface load rate capacity for the appropriate flight control surfaces. The motor drive signals 316 that the motor control circuit 212 supplies to the motors 318 is based, at least in part, on the determined control stick movement rate, the determined aircraft control surface slew rate capacity, and the determined aircraft control surface load rate capacity.

Figure 4:
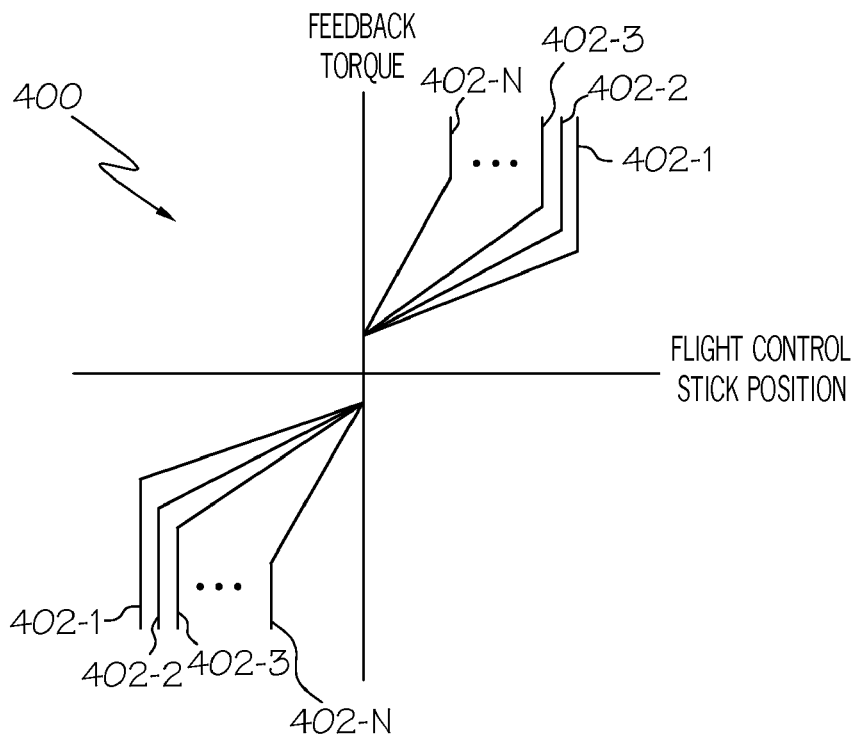
FIG. 4 graphically depicts an exemplary motor feedback torque versus flight control stick position function that may be implemented by the flight control surface actuation system of FIG. 2.
Figure 5:
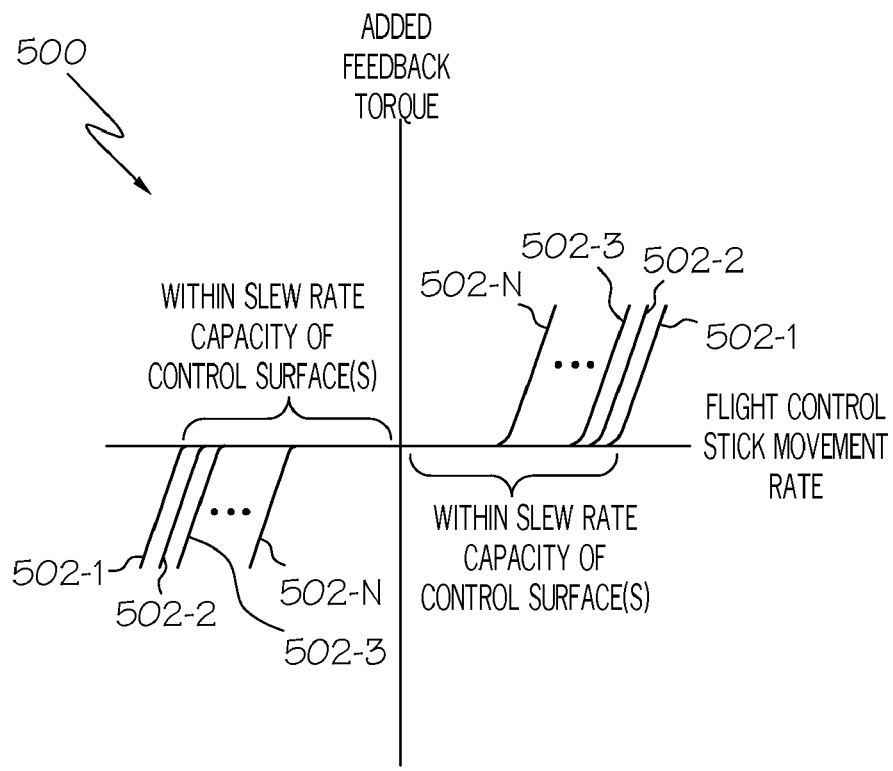
FIG. 5 depicts an exemplary added motor feedback torque versus flight control stick movement rate function that may be implemented by the flight control surface actuation system of FIG. 2.
Figure 6:
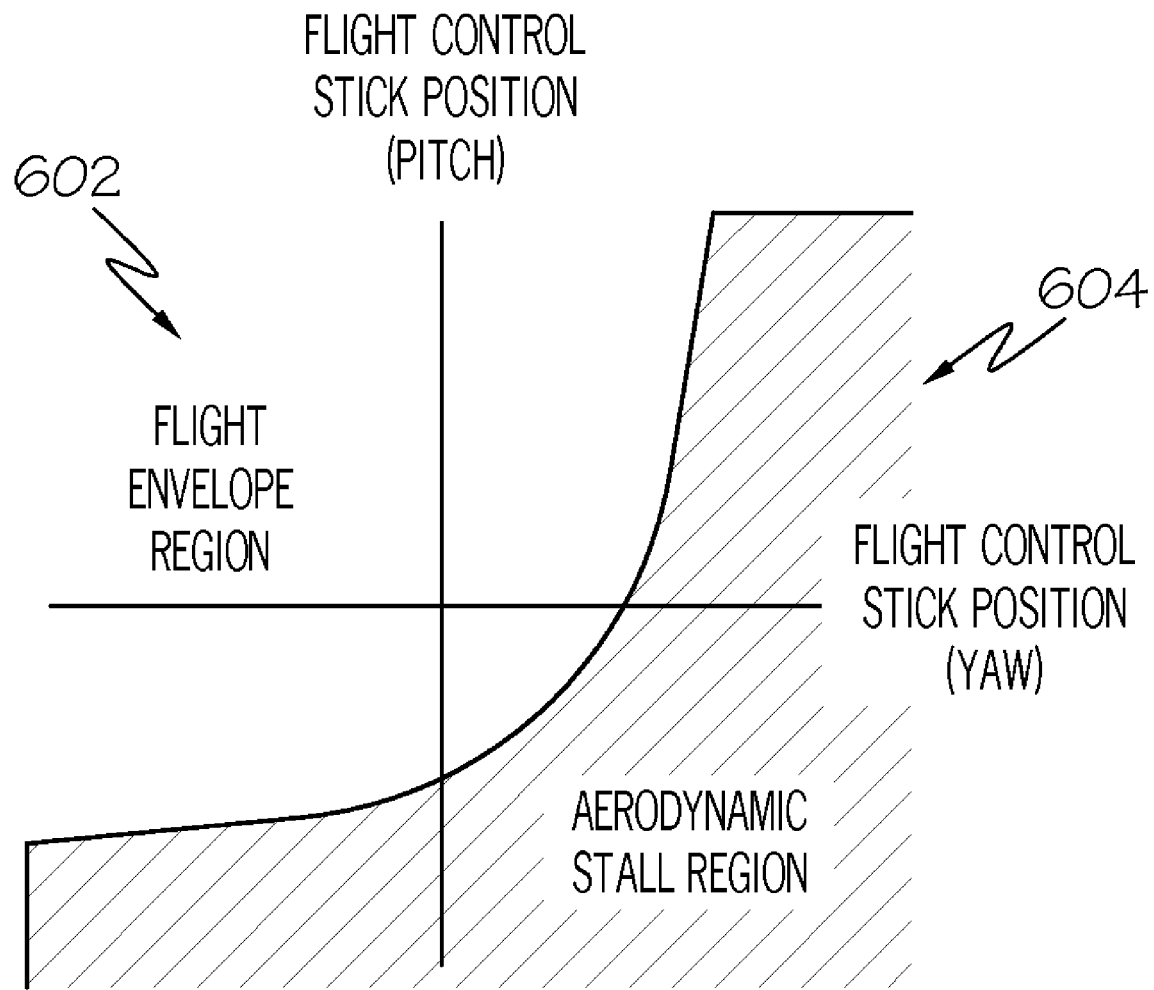
FIG. 6 depicts a graph of an exemplary aircraft flight envelope and stall boundaries for various flight control stick positions that may be implemented by the flight control surface actuation system of FIG. 2.

The above-described variation in haptic feedback may be more fully appreciated by referring to FIGS. 4-6. In particular, FIG. 4 depicts an exemplary motor feedback torque versus flight control stick position function 400 that the motor control circuit 212 may implement, and FIG. 5 depicts an exemplary added motor feedback torque versus flight control stick movement rate that the motor control circuit 212 may implement. The torque versus position function 400 and the added torque versus rate function 500 are each depicted as a family of torques versus positions (402-1, 402-2, 402-3, . . . , 402-N) and added torques versus rates (502-1, 502-2, 502-3, . . . , 502-N), respectively, for various aircraft speeds, ranging from relatively low aircraft speeds 402-1, 502-1 to relatively high aircraft speeds 402-N, 502-N. From the depicted torque versus position function 400, it may be appreciated that the motor drive signals 316 that the motor control circuit 212 supplies to the motors 318 is such that the haptic feedback supplied by the motors 318, for a given control stick position, increases as aircraft speed increases. Moreover, from the depicted added torque versus rate function 500 it may be appreciated that if the movement rate of the flight control sticks 210 does not exceed the determined control surface slew rate capacity (or capacities), the motor drive signals 316 that the motor control circuit 212 supplies to the appropriate motors 318 will not result in increased haptic feedback to the flight control sticks 210. Conversely, if the movement rate of the flight control sticks 210 does exceed the determined control surface slew rate capacity (or capacities), the motor control circuit 212 will supply motor drive signals to the appropriate motors 318 that cause the motors 318 to additional haptic feedback to the flight control stick 210. The control surface slew rates, as may be appreciated, may vary with aircraft conditions, such as aircraft attitude and/or speed. Thus, as FIG. 5 depicts, the added torque versus rate function 500 varies with aircraft speed.

In addition to the above, the motor drive signals 316 may vary based on a determination of an aerodynamic stall risk. More specifically, it is generally known that each aircraft has a predetermined operating envelope that may vary with various aircraft operating conditions, including the position of the flight control sticks 210. For example, and with reference now to FIG. 6, an allowable flight region 602 and an aerodynamic stall region 604 versus flight control stick positions (e.g., pitch and yaw) are graphically depicted. It will be appreciated that the flight envelope region 602 and aerodynamic stall region 604 will typically vary with aircraft and various other flight conditions. Nonetheless, the motor control unit 212 and/or flight control unit 202, based in part on the position of the flight control stick 210, determines the aerodynamic stall risk of the aircraft. The motor drive signals 316 supplied to the motors 318 are then based on the determined aerodynamic stall risk. For example, if the flight control stick 210 is moved to a position that will cause, or will soon cause, an aerodynamic stall risk, the motor drive signals 316 will cause the motors 318 to supply an increased haptic feedback force to the flight control stick 210.

The motor drive signals 316 that the motor control circuit 212 supplies to the motors 318 may also vary based on a mismatch in pilot and co-pilot stick positions, and on the control surface positions (e.g., a relatively high feedback force is supplied when control surface stops are reached). In the depicted embodiment, the pilot and co-pilot stick position deviation function can be overridden. More specifically, and with reference once again to FIG. 3, it is seen that the system 200 further includes a co-pilot override switch 338 and a pilot override switch 342. Each of these switches 338, 342 may be implemented as hardware switches or software switches, and are each movable between first and second positions. When the switches 338, 342 are in the first position, the motor control circuit 212 is responsive to the position signals 306 supplied from both the pilot and co-pilot flight control sticks 210, and the flight control surface position signals 312 supplied to the flight control unit 202 are preferably an average of the pilot and co-pilot flight control stick positions 210. Conversely, when the co-pilot 338 or pilot 342 override switch is in the second position, the motor control circuit 212 is responsive to only the position signal 306 supplied from the pilot or the co-pilot flight control stick, respectively.

The system 200 described herein does not include a force sensor. Rather, by knowing the characteristics of the motors 318 and gear sets 322, the desired force feel can be determined and transmitted to the gripping point of the flight control sticks 210 without the feedback from a force sensor. If certain properties of the motors 318 and gear sets 322, such as friction or inertia, are undesirable, these properties can be cancelled or replaced by more desirable properties by the control laws and algorithms of the control unit 212. It is noted that often-times properties such as centering preload, mass, damping and hysteresis are specified by the end user. In addition, any undesirable effects introduced by accommodating these requirements, such as high-frequency chatter or oscillation, can be eliminated by proper filtering of the various control signals (motor position, speed and current). In this manner, the force sensor is not only eliminated, but is also improved upon.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A pilot flight control stick haptic feedback system, comprising:
   a pilot user interface configured to receive user input and, upon receipt thereof, to move to a position at a movement rate;
   a position sensor coupled to, and configured to sense the position of, the pilot user interface, the position sensor further configured to supply a pilot user interface position signal representative of the pilot user interface position;
   a pilot motor coupled to the pilot user interface, the pilot motor further coupled to receive pilot motor feedback signals and operable, upon receipt thereof, to supply a feedback force to the pilot user interface at a magnitude based on the pilot motor feedback signals; and
   a control circuit coupled to receive at least the pilot user interface position signal and configured to:
      (i) determine the pilot user interface movement rate, aircraft control surface slew rate capacity, and aircraft control surface load rate capacity, and
      (ii) supply the pilot motor feedback signals to the pilot motor based at least in part on the determined pilot user interface movement rate, the determined aircraft control surface slew rate capacity, and the determined aircraft control surface load rate capacity.

2. The system of claim 1, wherein:
   the control circuit comprises a motor control circuit and a flight control unit coupled to the motor control circuit;
   the flight control unit is configured to supply one or more force feedback influence signals to the motor control circuit; and
   the motor control circuit is configured, in response to the one or more force feedback influence signals, to determine aircraft control surface slew rate capacity and aircraft control surface load rate capacity.

3. The system of claim 2, wherein the one or more force feedback influence signals comprise one or more signals representative of control surface load rate limits, control surface slew rate limits, control surface no-load positions, or control surface stop positions.

4. The system of claim 2, wherein the flight control unit is adapted to receive one or more signals representative of aircraft conditions and is operable, in response thereto, to supply the one or more force feedback influence signals.

5. The system of claim 4, wherein the one or more signals representative of aircraft conditions comprise one or more signals representative of flight control surface position, aircraft speed, aircraft altitude, and aircraft attitude.

6. The system of claim 2, wherein:
   the motor control circuit is further configured to supply flight control surface position signals to the flight control unit; and
   the flight control unit is configured to be responsive to the flight control surface position signals.

7. The system of claim 1, wherein the control circuit is further configured to supply the pilot motor feedback signals to the pilot motor based at least in part on flight control surface stop positions.

8. The system of claim 1, wherein the control circuit is further configured to:
   determine an aerodynamic stall risk based on the pilot user interface position; and
   supply the pilot motor feedback signals to the pilot motor based further in part on the determined aerodynamic stall risk.

9. The system of claim 1, further comprising:
   a co-pilot user interface configured to receive user input and, upon receipt thereof, to move to a position at a movement rate;
   a co-pilot position sensor coupled to, and configured to sense the position of, the co-pilot user interface, the co-pilot position sensor further configured to supply a co-pilot user interface position signal representative of the co-pilot user interface position; and
   a co-pilot motor coupled to the co-pilot user interface, the co-pilot motor further coupled to receive co-pilot motor feedback signals and operable, upon receipt thereof, to supply a feedback force to the co-pilot user interface at a magnitude based on the co-pilot motor feedback signals,
   wherein the control circuit is further coupled to receive the co-pilot user interface position signal and is further configured to:
      (i) determine the pilot and co-pilot user interface movement rates, and
      (ii) supply the pilot and co-pilot motor feedback signals to the pilot and co-pilot motors, respectively, based further in part on the co-pilot user interface movement rate.

10. The system of claim 9, wherein:
    the control circuit comprises a motor control circuit and a flight control unit coupled to the motor control circuit;
    the flight control unit is configured to supply one or more force feedback influence signals to the motor control circuit; and
    the motor control circuit is configured, in response to the one or more force feedback influence signals, to determine aircraft control surface slew rate capacity and aircraft control surface load rate capacity.

11. The system of claim 10, wherein:
    the motor control circuit is further configured to (i) determine an average position of the pilot and co-pilot user interfaces and (ii) supply flight control surface position signals to the flight control unit based on the determined average position; and
    the flight control unit is configured to be responsive to the flight control surface position signals.

12. The system of claim 10, further comprising:
    a co-pilot override switch movable between a first position, in which the motor control circuit is responsive to the co-pilot position signal, and a second position, in which the motor control circuit is non-responsive to the co-pilot position signal; and
    a pilot override switch movable between a first position, in which the motor control circuit is responsive to the pilot position signal, and a second position, in which the motor control circuit is non-responsive to the pilot position signal.

13. The system of claim 12, wherein:
    the co-pilot override switch is disposed at least proximate the pilot user interface; and
    the pilot override switch is disposed at least proximate the co-pilot user interface.

14. A pilot flight control stick haptic feedback system, comprising:
    a pilot user interface configured to receive user input and, upon receipt thereof, to move to a position at a movement rate;
    a position sensor coupled to, and configured to sense the position of, the pilot user interface, the position sensor further configured to supply a pilot user interface position signal representative of the pilot user interface position;

a pilot motor coupled to the pilot user interface, the pilot motor further coupled to receive pilot motor feedback signals and operable, upon receipt thereof, to supply a feedback force to the pilot user interface at a magnitude based on the pilot motor feedback signals; and a control circuit coupled to receive at least the pilot user interface position signal and configured to:
  (i) determine the pilot user interface movement rate, aircraft control surface slew rate capacity, and aircraft control surface load rate capacity,
  (ii) determine an aerodynamic stall risk based on the pilot user interface position, and
  (ii) supply the pilot motor feedback signals to the pilot motor based at least in part on the determined pilot user interface movement rate, the determined aircraft control surface slew rate capacity, the determined aircraft control surface load rate capacity, and the determined aerodynamic stall risk.

* * * * *